Oct. 23, 1951  M. W. PATRICK  2,572,816
PRESSURE RELIEF VALVE
Filed Oct. 11, 1944
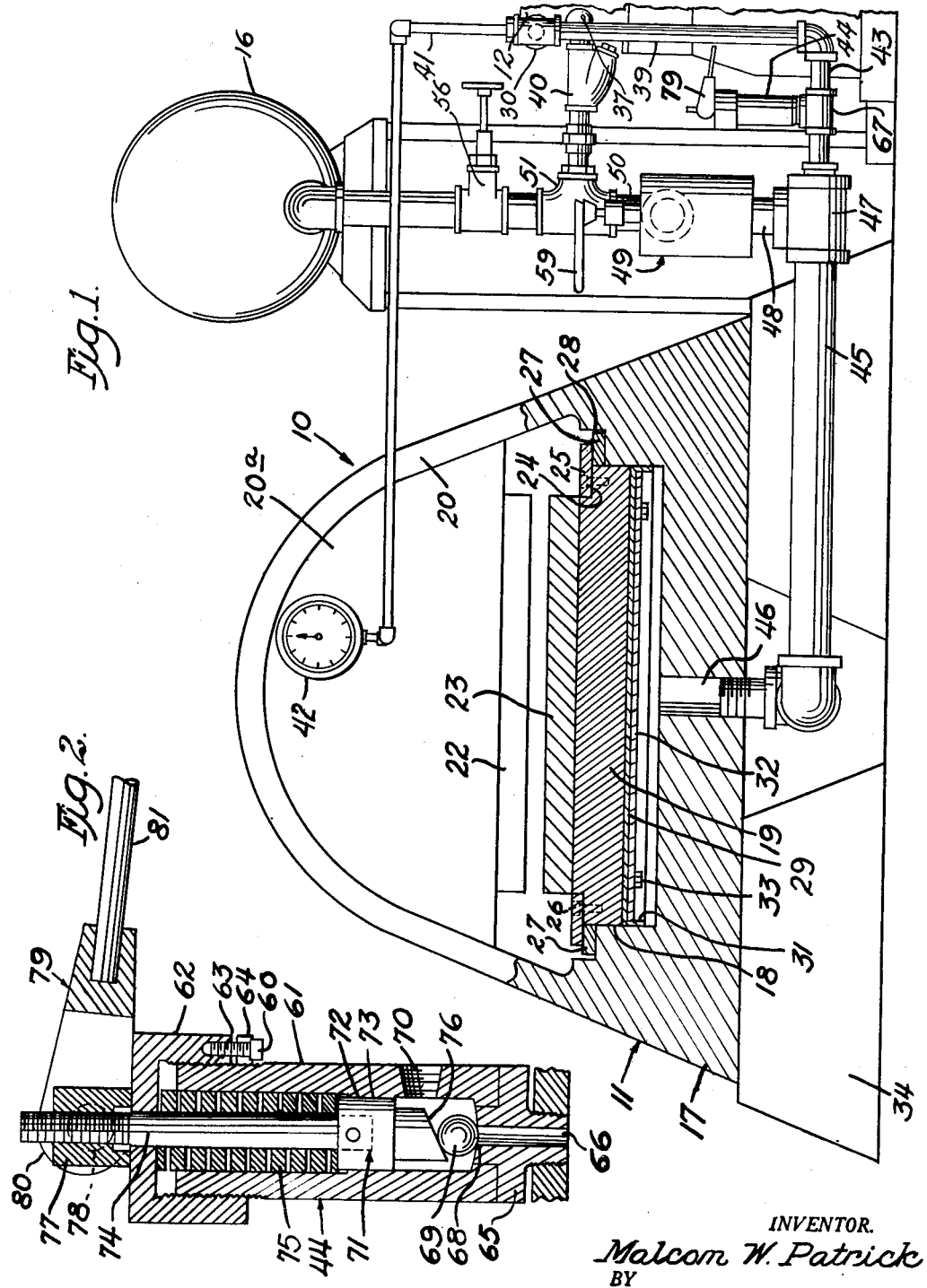
INVENTOR.
Malcom W. Patrick
BY
C. Thomas Cox Patented Oct. 23, 1951

2,572,816

UNITED STATES PATENT OFFICE 2,572,816

PRESSURE RELIEF VALVE

Malcom W. Patrick, Lakewood, Ohio, assignor to The S. K. Wellman Company, Cleveland, Ohio, a corporation of Ohio Application October 11, 1944, Serial No. 558,206

4 Claims. (Cl. 137—53)

1

This invention relates to hydraulic presses, and more particularly to relief valve mechanism employed in connection therewith.

The principal object of the invention is the provision of a new and improved relief mechanism for hydraulic presses and the like, for automatically releasing the pressure in the hydraulic column when the same, for any reason whatever, exceeds a predetermined amount.

Another object of the invention is the provision of a new and improved relief valve that is adapted to be inserted in a high pressure hydraulic line, and which is so constructed as to open automatically and promptly to its full extent when the pressure in that line exceeds a predetermined amount, and to remain in fully open position until manually released.

A further object of the invention is the provision of a new and improved relief valve for high pressure fluid lines that will automatically and promptly open to its full extent and relieve the pressure in the line when the same rises above a predetermined amount, and will remain in fully open position until manually released and permitted to move by gravity to its closed position.

A still further object of the invention is the provision of a new and improved pressure relief valve that is simple in construction, effective and automatic in operation, does not chatter, effects a prompt release of pressure, is composed of few moving parts, and that is easily assembled and rugged in construction.

Other and further objects and advantages of the invention will appear from the following description, taken in connection with the accompanying drawings in which Fig. 1 is an end elevation of an apparatus for sizing articles made from powdered metal with parts shown in section; and Fig. 2 is a vertical section of the relief valve, with parts broken away.

In the manufacture of articles from powdered material, including powdered metal, the material in measured amounts is subjected to a very considerable pressure and is then bound to a metal backing by heating the compressed material to the sintering point and simultaneously applying considerable pressure. The article is then sized. In sizing articles made from powdered metal great pressure is applied to the article to compress it to the required thickness.

In the present instance this is accomplished by the use of a hydraulic press having a piston of large cross-sectional area and short stroke operated by a multi-cylinder pump which forces the liquid through an intake passage of relatively

2 small cross-sectional area for operating said piston. The pressure is controlled by a manually operated valve, and in the operation of the press a pressure gauge is provided for indicating to the operator the pressures developed. In practice the operator opens the control valve when the gauge indicates the desired or predetermined pressure, but if for any reason the control valve is not opened by the operator when the pressure reaches the predetermined amount it is desirable that means be provided for automatically promptly releasing the pressure when the same rises above that amount. Such a valve is provided in the present invention. This valve, including the plunger, is so constructed that when it opens by excess pressure it immediately opens to its full extent, so that there is no chattering of the valve. This is considered an important feature of the invention. Because of the great pressures used, chattering would be very detrimental to the valve and its seat. Not only is the valve promptly moved to full open position when the excess pressure unseats the valve, but the valve is also moved laterally so that it is held in inoperative position immediately after it is unseated.

Referring now to the drawing, the reference character 10 designates the apparatus for sizing articles made from powdered metal, which comprises a hydraulic press 11, a multi-piston pump or compressor 12, a motor and reduction gearing (not shown) for driving the same, and a storage tank 16. The hydraulic press 11 (Fig. 1) comprises the metal base portion 17, having a cylinder bore 18 therein in which is slidably mounted a ram or piston 19 of very large area. Rigidly connected to the base portion 17, as by being integral therewith, is the metal upper or stationary portion 20 of the press 11. The upper portion 20 is a powerful metal shell inclosing a mass of metal 20ª which has attached to its under side a plate or anvil portion 22 of the press. The base 17 and upper portion 20 taper upwardly for forming a dome having a curved upper surface for increasing their strength, and are massive structures so designed as to resist tremendous pressures. The stationary or anvil portion 22 of the press is rigidly connected to the upper portion, and is adapted to cooperate with a piston plate or platen 23 carried by the piston 19.

The parts are so constructed that the piston 19 has a very short throw, stroke or movement, as indicated in Fig. 1 of the drawing. The piston 19 is circular in cross-section and has a rabbet 24 around its upper edge, and seated in this rabbet is an annular plate 25, held in position in the rabbet by any suitable means, such as the screws 26 tapped in the piston 19. The annular plate 25 extends radially outwardly beyond the outer edge of the piston 19, and is adapted, when the piston is in lowered position, to engage an annular plate 27 engaging in a rabbet 28 surrounding the cylinder bore 18 of the press. The engagement of the plates 25 and 27 limits the downward movement of the piston 19, which, as will presently appear, is moved downwardly by gravity when the hydraulic pressure is released.

Suitable sealing means are provided for the piston for preventing the hydraulic fluid from escaping between the piston and cylinder wall when pressure is applied to the piston. In the form of construction shown a sheet of flexible material 29, which is of greater diameter than the piston 19 so that its outer edge is turned downward, as shown at 31 in Fig. 1, is secured in position by a rigid plate 32 against the bottom of the piston, as by means of screws 33. The press is mounted on a massive foundation metal block or member 34, as shown in Fig. 1, and is provided with passages and recesses for receiving the necessary pipes for supplying the hydraulic medium to the hydraulic cylinder 18 below the piston.

The piston 19 is adapted to be operated hydraulically by a multi-cylinder pump 12, as will now be described more or less generically. It is constructed very similar to the multi-cylinder engine used in automobiles, and has an intake passage 37 and a discharge passage 30 which contains a check valve (not shown). The intake passage 37 may be provided with a filter 40 for filtering the hydraulic fluid. The hydraulic fluid employed is preferably oil, although any suitable fluid may be used. In the construction shown the liquid from the compressor passes along the discharge passage 30 through a check valve into a pipe 39, where it divides, and a portion passes up through the passage 41 to a pressure gauge 42 for indicating the pressure applied to the liquid. The other portion passing down through the pipe 39 passes into the conduit 43, and inserted in this conduit is the relief valve 44, which constitutes the principal feature of this invention. The conduit 43 is connected with a passage 45, which in turn is connected to a pipe 46 which delivers the liquid beneath the piston 19.

A three-way passage 47 is inserted between the conduit 43 and the passage 45, and a conduit 48 is in communication with this three-way passage 47. The conduit 48 passes upwardly and is in communication with pipes leading to the reservoir or hydraulic tank 16, and to the intake passage 37 of the pump. A control valve 49 is provided in the conduit 48 for controlling the passage of the oil to the tank and intake through the conduit 43. The intake 37 for the compressor is in communication with the conduit 48 above the valve 49, as at 51. When the valve 49 is closed the hydraulic fluid is forced by the pump into the cylinder 18 below the piston 19 for elevating the same. When the valve is opened the fluid is forced through the valve to both the pump and reservoir 16. The weight of the piston 19 will force the liquid beneath the piston back through the pipe 45 into the pump intake or into the reservoir 16.

The valve 49 is provided with a valve seat facing downwardly which is adapted to be engaged by a valve head for closing the passage through the valve. The valve head is provided with a valve stem terminating in a handle member or wheel 59 for turning it to seating and unseating positions. The space within the valve above the head has attached to it an extension of the conduit 48, and this in turn extends laterally and is connected to the conduit 50 leading to the reservoir and intake 37 of the pump. The foregoing details of the valve 49 form no part of the present invention and may be varied, and accordingly it is not thought necessary to illustrate them.

It will thus be seen that when the valve 49 is closed the oil discharged from the compressor 12 through the discharge passage 30 will move upwardly to the gauge 42 and downwardly through the pipe 39, laterally through the conduit 43, through the connector 47, pipes 45 and 46 into the space beneath the piston 19 for causing the latter to be elevated, and that the entire pressure of the hydraulic fluid will be exerted on the gauge 42 and on the piston 19.

Suitable means are provided for automatically releasing the pressure being applied to the piston when it rises above a predetermined amount. This mechanism is shown in Fig. 2, and is in communication with the passage 43, as shown in Fig. 1. This relief valve 44 comprises a casing 61 having an axial bore extending longitudinally therethrough. The upper end of the casing is externally threaded, and a cap member 62 is adapted to be attached to the upper end of the casing, as by being threaded thereon. The cap may be provided with a kerf or saw cut 63 along one edge, and a set-screw 60 threaded into the main body of the cap and slidably engaging the partially severed smaller portion 64 for distorting the same is adapted to be used for locking the cap on the casing 61 in adjusted position. The adjustment of the cap 62 will vary the compression of the associated spring, as will presently appear. The lower end of the casing has attached thereto, a valve seat member 65 of hard wear-resisting metal, which is provided with an axial opening 66 in alinement with the axis of the bore of the casing. The lower end of the valve seat member 65 is threaded, and is adapted to engage in a threaded opening in the wall of the conduit 43, or in a union 67 of said passage for holding the valve in upright position. A concave valve seat 68 is formed on the upper end of the member 65, and a suitable ball valve 69 engages this seat.

A spring-pressed plunger 71 engages the ball valve 69 for normally holding the same in closed position. The plunger 71 is provided with a piston-like portion 72 of hard wear-resisting material that makes a close fit with a portion of the bore 73 just above the valve seat 68. The plunger is provided with an upwardly extending stem 74, which extends upwardly through an axial opening in the cap 62 and slidably engages the same. A spring or resilient member 75 is inserted between the cap 62 and the plunger 71 for normally holding the latter in lowered position. The cap member 62 may be adjusted for adjusting the compression of the spring 75. It will thus be seen that when the pressure in the passage 66 becomes greater than the compressive force of the spring 75, the valve will become unseated and relieve the pressure in the line 45 leading to the piston 19.

It is desirable that when the pressure is relieved in the hydraulic column operating the piston the valve be held in its open position until the plunger is manually operated to permit the valve 69 to move by gravity to closed position. In the construction shown, this is accomplished by providing an upwardly and outwardly inclined or camming surface 76 on the lower end of the reduced portion of the plunger 71. This inclined surface will normally engage the ball valve 69 and hold the same in lowered position on the concave valve seat 68. The inclination of the camming surface is such that a line through the center of the ball valve passing through the point of said surface tangent to the ball will fall within the valve seat, whereby the valve will normally be held in closed position. As soon as the pressure becomes sufficient to unseat the ball 69, the inclined surface 76 will force or deflect the ball to the right in Fig. 2, whereby the spring will lower the plunger for preventing the valve from rolling back onto the concave seat 68 until the plunger 71 is manually withdrawn.

Suitable means are provided for manually releasing the valve 69 after it has been unseated and while being held in open position by the inclined surface 76 of the plunger 71. In the form of construction shown, the upper end of the valve stem 74 above the cap 62 is provided with a nut or trunnion block 77, which has trunnions 78 extending outwardly therefrom in opposite directions, and a cam member 79, bifurcated at its lower end, is rotatably mounted on the trunnions 78. The cam member 79, having a rounded cam surface 80, is provided with a handle 81 for rotating the same. The parts are so constructed that when the cam member is in the position shown in Fig. 2 the spring 75 is exerting its force downwardly against the plunger 71, which in turn will hold the ball valve 69 on the seat 68; but by turning the handle 81 in a vertical plane through an angle of 180° the cam will compress the spring and elevate the inclined surface 76 so that it will not contact the ball, and the latter will then roll by gravity to its proper position on the concave seat 68. The downward movement of the plunger may be limited by adjusting the trunnion blocks along the valve stem 74. Normally the full force of the spring 75 is exerted on the valve 69 for holding the same on its seat.

In the operation of the device the valve 49 is closed by turning the handle or wheel 59, which prevents the hydraulic fluid from passing back to the intake of the pump or compressor. The liquid will then pass from the pump or compressor through the discharge passage 38 and its check valve into the pipe 39, where it divides and a portion flows upwardly through the passage 41 to the pressure gauge 42, which indicates the pressure of the liquid column. The remainder of the hydraulic fluid passes downwardly through the pipe 39, laterally through the conduit 43, the union 67, the three-way passage 47, passage 45 and pipe 46 into the cylinder bore or cavity 18 beneath the piston 19, for forcing the same upwardly for compressing the article between the anvil 22 and the platen or piston plate 23. The operator watches the gauge, and after the same reaches a predetermined pressure he turns the wheel or handle member 59 for unseating the valve head of the valve 49 for permitting the liquid in the passages 45 and 46 to reverse its direction of flow upwardly through the conduit 48 and its connection to the intake 37 of the pump; or, if the valve 56 in the upper portion of the pipe 50 is open, the liquid is free to flow also to the tank 16.

If the pump continues to run the liquid will pass outwardly through the discharge passage 38 around to the three-way passage 47, and will be shunted upwardly through the valve and back to the intake passage 37 of the pump. The weight of the piston will force the hydraulic liquid contained in the cylinder bore or cavity 18 below the piston 19 out through the valve 49, as indicated above. After the piston 19 has been lowered to its limit of travel the article that has been sized is removed and a new article or articles inserted, the valve 49 closed, and the operation is repeated.

Should the pressure in the pipe 39 rise above a predetermined amount, as indicated by the gauge, and the valve 49 be not opened, the excess pressure will open the relief valve 69 and permit the escape of the liquid through a passage 70, which may be connected to a suitable reservoir or to the tank 16 through a suitable conduit. When the ball valve 69 is unseated the inclined or cam surface of the plunger 76 will direct the ball to the right in Fig. 2, and this valve will be held in open or inoperative position until manually released. The ball is manually released by moving the handle 81 through 180° to the left, as shown in Fig. 2, which causes the cam surface 80 to engage the upper end of the cap member 62, thus elevating the plunger against the tension of the spring 75, and this will permit the ball valve 69 to roll by gravity down the inclined surface of the valve seat 68. The handle 81 is then turned to its normal position shown in Fig. 2, for normally holding the valve 69 to its concave seat on the valve seat member 65.

As has been observed above, the pressure exerted by the spring 75 on the ball valve 69 may be adjusted by loosening the set-screw 60 and turning the cap member 62. This rotation is readily accomplished if the handle 81 is rotated 180° in a vertical plane to elevate the cam member 79 and remove pressure from the ball valve 69. In this elevated position of the cam member, the cap member 62 can be easily turned to the desired degree. After adjustment, the handle 81 is moved to its position shown in the figures. Due to the great pressure exerted by the spring 75 and the resultant friction between the cam member 79 and ball valve 69, turning of the cap member 62 is very difficult unless the cam member is elevated. The structure shown permits such elevation and makes for easy adjustment of the valve.

It is thought from the foregoing, taken in connection with the accompanying drawing, that the operation and construction of my device will be apparent to those skilled in the art, and that changes in size, shape, proportion and details may be made without departing from the spirit and scope of the appended claims.

I claim as my invention:

1. A relief valve for use in a press for sizing, which comprises a body portion screw-threaded at its upper end and having an axial bore, a cap engaging said screw threads, a valve seat member of wear-resistant material in the lower end of said bore, said seat member having a restricted axial bore in alinement with the bore of said body portion, the upper end of said restricted bore forming a valve seat, a ball valve engaging said seat, the lower end of said valve seat member being threaded for engaging a threaded opening in a high pressure fluid line, a plunger within said first-named bore and having a cam face on its lower end tangentially engaging said ball valve, the angle of said cam surface being such that a diameter of said ball passing through the point of tangency of said ball when seated will fall within the perimeter of said seat for holding said valve seated until unseated by excess pressure in said seat bore and being such as to cause said ball valve when unseated to move laterally of said seat and in contact therewith and be held in such unseated position, a spring between said plunger and cap, and means for locking said cap in position for tensioning said spring.

2. A relief valve comprising a body having a seat therein and a valve member for closing said seat, a spring pressed member normally urging said valve member onto said seat, means preventing lateral movement of said spring pressed member, said spring pressed member having a portion for holding said valve member in open position and in engagement with a portion of said seat after opening of said valve member, and manually operable means for releasing said holding portion to allow said valve member to seat by gravity.

3. A relief valve comprising a body having therein a seat and an area adjacent thereto, a valve member for closing said seat, a spring pressed member normally urging said valve member onto said seat and being mounted by guide means limiting movement of the member to a direction axially toward and away from said seat, said spring pressed member having a portion for holding said valve member in open position and in engagement with the area adjacent to said seat after opening of said valve member, and manually operable means for releasing said holding portion to allow said valve member to seat by gravity.

4. A relief valve comprising a body having therein a seat and an area adjacent thereto, a ball valve member for closing said seat, a member spring pressed toward said valve member and having a cam surface normally tangentially engaged with said valve member for holding said valve member in closing relation to said seat, guide means confining the spring pressed member against lateral movement and permitting retraction of said cam surface after opening of said valve member to hold said valve means on said area adjacent to said seat, and manually operable means for retracting said spring pressed member to allow said valve member to move by gravity back into closing relation to said seat.

MALCOM W. PATRICK.

REFERENCES CITED

The following references are of record in the file of this patent:

UNITED STATES PATENTS

| Number | Name | Date |
|---|---|---|
| 216,801 | Miller | June 24, 1879 |
| 861,975 | Hardy et al. | July 30, 1907 |
| 1,099,032 | Fraser | June 2, 1914 |
| 1,519,455 | Jacomini et al. | Dec. 16, 1924 |
| 1,598,487 | Marden | Aug. 18, 1926 |
| 1,807,564 | Blunn | May 26, 1931 |
| 1,807,661 | Heghinian | June 2, 1931 |
| 1,896,706 | Grimes | Feb. 7, 1933 |
| 2,103,673 | Hoferer | Dec. 28, 1937 |
| 2,174,550 | Chapman | Oct. 3, 1939 |
| 2,217,880 | Woodson | Oct. 15, 1940 |
| 2,273,315 | Cotner | Feb. 17, 1942 |

FOREIGN PATENTS

| Number | Country | Date |
|---|---|---|
| 39,086 | France | June 1, 1931 |
| 41,813 | Holland | May 26, 1931 |
| 107,694 | Switzerland | Nov. 1, 1924 |
| 297,037 | Germany | Mar. 17, 1917 |